Jan. 16, 1923.
O. A. LUCIER.
LOCKING MECHANISM FOR MOTOR VEHICLES.
FILED MAY 6, 1921.
1,442,487
3 SHEETS-SHEET 1
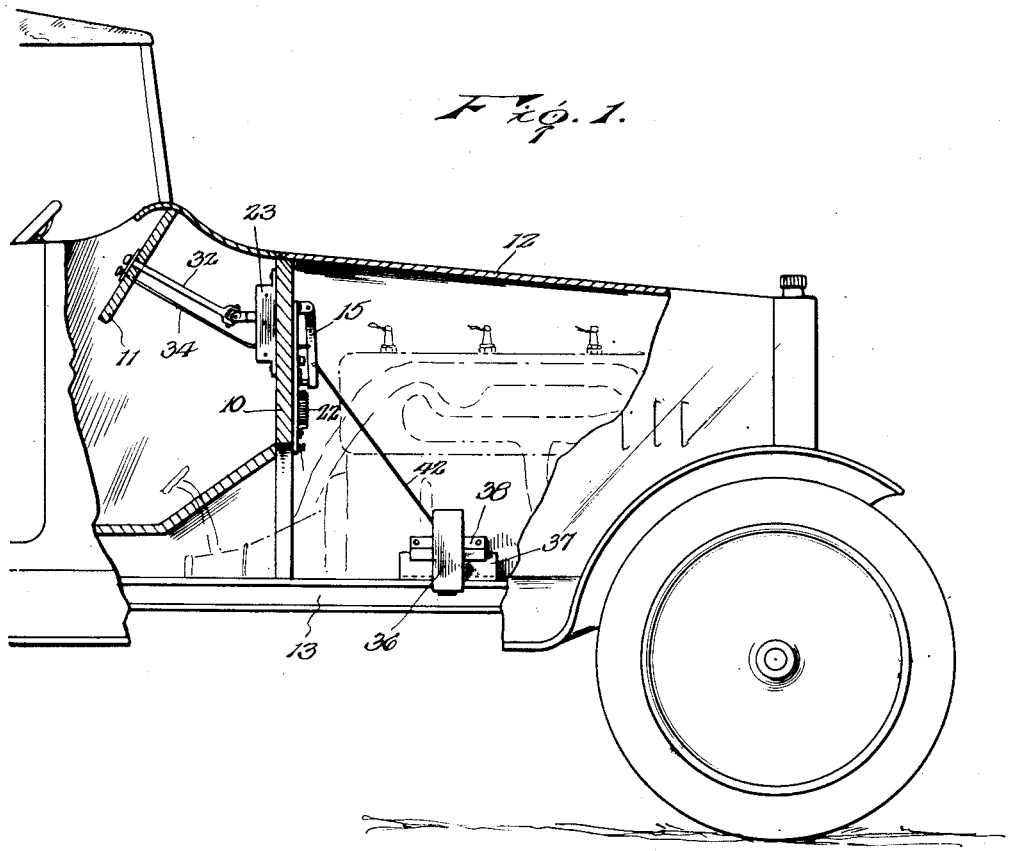
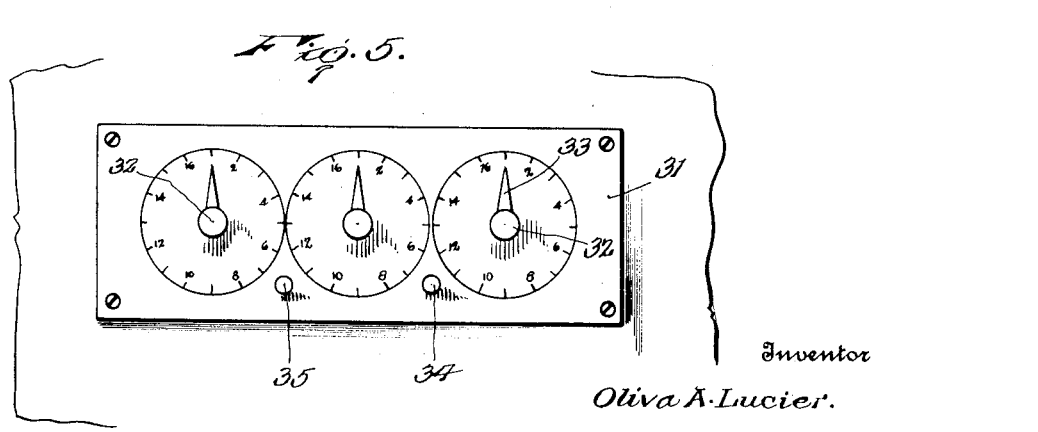
Inventor
Oliva A. Lucier.
By
Lacey & Lacey, Attorneys

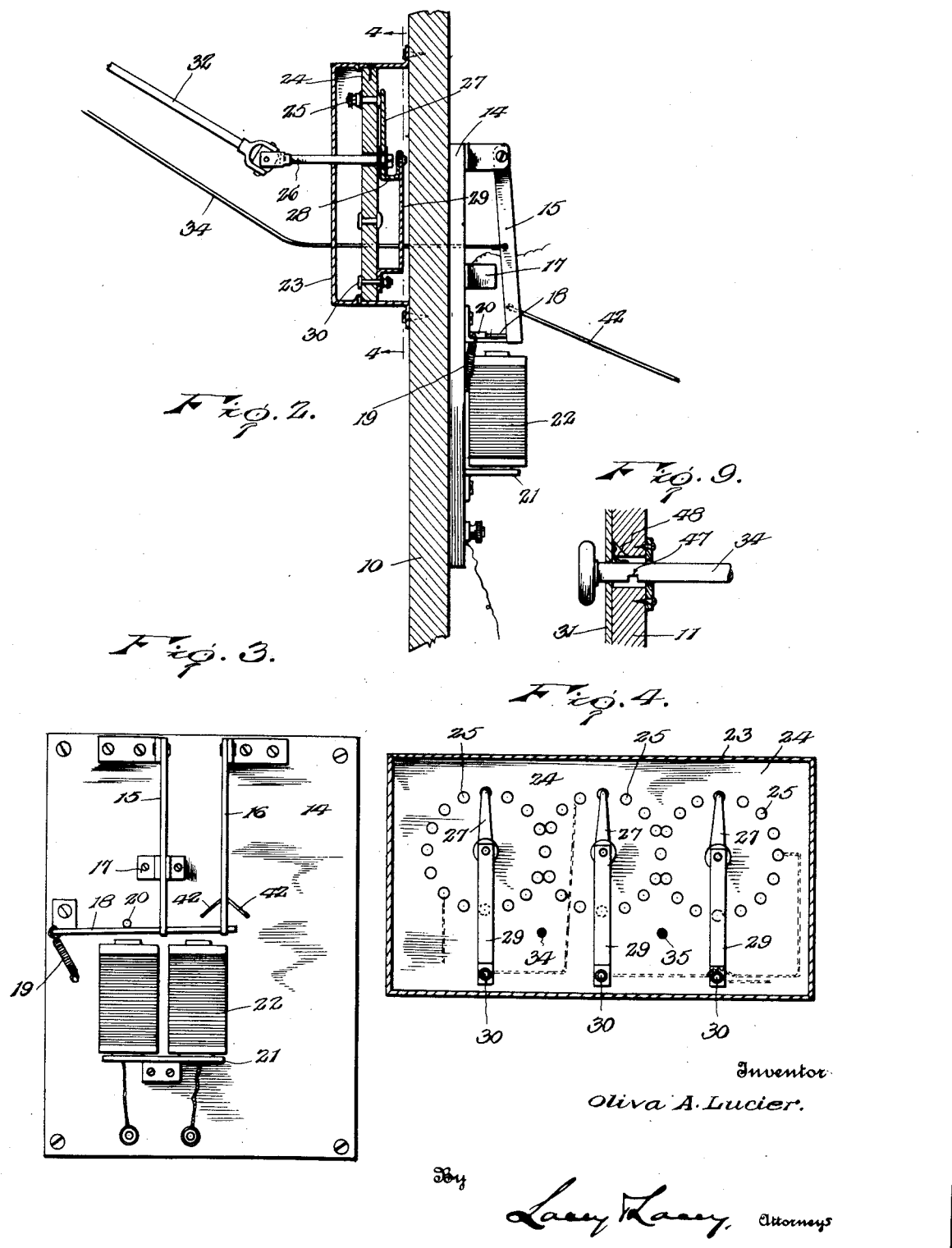

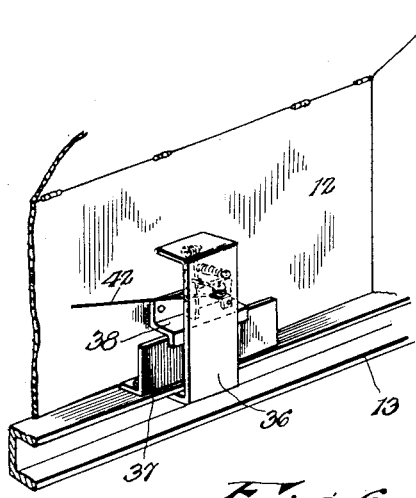
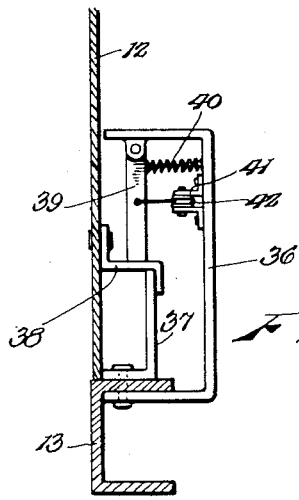
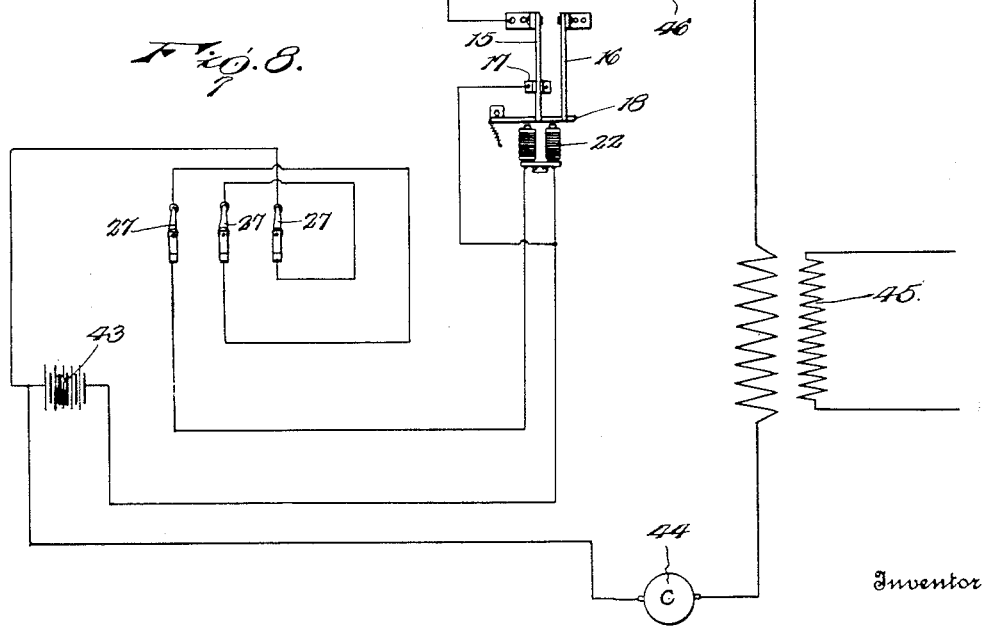

Patented Jan. 16, 1923.

1,442,487

UNITED STATES PATENT OFFICE.

OLIVA A. LUCIER, OF BALTIC, CONNECTICUT.

LOCKING MECHANISM FOR MOTOR VEHICLES.

Application filed May 6, 1921. Serial No. 467,477.

*To all whom it may concern:*

Be it known that I, OLIVA A. LUCIER, a citizen of the United States, residing at Baltic, in the county of New London, and State of Connecticut, have invented certain new and useful Improvements in Locking Mechanism for Motor Vehicles, of which the following is a specification.

This invention relates to an improved locking mechanism for motor vehicles and has as one of its principal objects to provide a mechanism which will effectually prevent the theft of an automobile.

The invention has as a further object to provide a lock controlling the ignition circuit of the vehicle and wherein said circuit can be closed only by a knowledge of the proper combination of the lock.

And the invention has as a still further object to provide a lock controlling not only the ignition circuit of the vehicle but also locking the hood of the vehicle closed so that tampering with the circuit wires within the hood will be prevented.

Other and incidental objects will appear hereinafter.

In the drawings:

Figure 1 is a fragmentary side elevation showing my improved lock in connection with a motor vehicle of conventional design, parts being broken away and illustrated in section, Figure 2 is a fragmentary section showing the mounting of the lock upon the dash of the vehicle, Figure 3 is an elevation showing the switch employed, Figure 4 is a section on the line 4—4 of Figure 2, looking in the direction of the arrows, this view showing the contact arms of the lock, Figure 5 is a fragmentary elevation showing the dials employed, Figure 6 is a fragmentary perspective view showing one of the hood locking members employed, Figure 7 is an elevation of said hood locking member, a portion of the hood as well as the adjacent side member of the frame of the vehicle being illustrated in section, and Figure 8 is a diagrammatic view of the wiring system employed.

Fig. 9 is a detail section through the instrument board showing the manner in which the control rod is mounted therein.

Referring now more particularly to the drawings, I have shown my improved lock in connection with a motor vehicle of conventional design. The dash of the vehicle is indicated at 10, the instrument board at 11, the hood at 12, and one of the side members of the frame of the vehicle at 13. In carrying the invention into effect, I employ a base plate 14 upon which is pivoted a switch closing arm 15 and a second companion arm 16, the arm 15 being movable to engage a switch contact 17. Pivoted upon the base plate at substantially right angles to the arms 15 and 16 is a locking arm or armature 18, to the inner end of which is connected a spring 19 normally tending to swing the arm upwardly beneath the free ends of the arms 15 and 16 into the paths of swinging movement of the latter arms, and limiting the arm 18 is a stop 20. Secured to the base plate below the arm 18 is a bracket 21 upon which is mounted a pair of electro-magnets 22 disposed to cooperate with said arm for drawing the arm downwardly out of the paths of the arms 15 and 16 so that these latter arms may be freely swung inwardly toward the plate 14.

Suitably mounted upon the dash 10 opposite the plate 14 is a casing 23 in which is arranged a panel 24 of suitable dielectric material, and mounted upon this panel are preferably three annular series of contacts 25. Journaled through the panel axially of said series of contacts are shafts 26 upon the inner ends of which are fixed arms 27 to cooperate with said contacts and, as shown in Figure 2, these arms are provided at their inner ends with U-shaped terminals 28. Rotatably connected at their upper ends to said terminals axially of the shafts are conductor strips 29, the lower ends of which are secured to binding posts 30 extending through the panel. Thus, the arms 27 may be freely swung while, when any one of the arms is moved into engagement with one of the contacts 25, a circuit will be closed through the arm and through its contact strip 29 to the binding post 30 of said strip. Mounted upon the instrument board 11 of the vehicle is, as shown in Figure 5, a dial plate 31 having three dials each provided with graduations corresponding to the number of contacts 25 in each of the series of contacts upon the panel 24. Rotatably fitting through the dial plate axially of the dials thereon and through the instrument board 11, are control rods 32 connected to the shafts 26 by suitable universal joints and provided with pointers 33 to cooperate with the dials. Thus, the rods 32 may be manipulated for swinging the arms 27. Extending through the dial plate and through the instrument board is a control rod 34, the lower end of which is, as shown in Figure 2, directed forwardly to extend through the casing 23, through the panel 24, the dash 10, and plate 14, and is connected to the arm 15. A companion rod 35 is similarly connected to the arm 16, the rods being reciprocable for swinging said arms.

Secured to each of the side members of the frame of the vehicle within the vehicle hood is, as shown in Figures 6 and 7, a bracket 36 and mounted upon the side members adjacent said brackets are angle plates 37. Suitably mounted upon the sides of the hood to engage over said plates when the hood is closed, are plates 38 coacting with the plates 37 for preventing lateral outward movement of the sides of the hood. Pivoted upon the brackets to depend therefrom are locking arms 39 normally held to coact at their lower ends with the plates 38 by springs 40 so that the arms will thus lock the sides of the hood against upward movement. The brackets carry pulleys 41 and trained around said pulleys are flexible elements 42 connected, as shown in Figure 3, to the arm 16.

In Figure 8 of the drawings, I have shown a diagram of the wiring system employed in connection with the lock. The battery or other approved source of electrical energy upon the vehicle is indicated at 43, the commutator at 44, and the induction coils at 45. As will be observed, the arms 27 are connected in series with the electro-magnets 22, the wires being connected, of course, to the binding posts 30. Interposed in the circuit is the switch contact 17 and, preferably, a manually operable switch 46 is also interposed in the circuit. Accordingly, as will be seen, since the arm 15 will be normally held away from the contact 17 by the arm 18, the ignition circuit of the vehicle engine will be broken, thus making it impossible to operate the vehicle. At the same time, the arm 16 will also be held against rearward swinging movement by the arm 18 so that it will be impossible to swing the arms 39 for releasing the hood of the vehicle. Tampering with the wires of the ignition circuit of the vehicle will accordingly be prevented. However, by properly positioning the arms 27 by means of the control rods 32, the circuit through the magnets 22 may be closed, it being observed in this connection that since the arms 27 are connected in series, it will be necessary to move each arm to cooperate with a particular contact in order to close the circuit. A given combination will, of course, determine the proper adjustment for the arms and such adjustment may be readily obtained by means of the dials upon the plate 31. By employing a plurality of contacts in each of the series of contacts 25, provision is made whereby a great many different combinations may be had. Upon closing of the circuit through the magnets 22 the magnets will, of course, be energized and will thus attract the arm 18, swinging the arm downwardly out of the paths of the arms 15 and 16. The rod 34 may then be drawn rearwardly for swinging the arm 15 to engage the contact 17 when the vehicle engine may be started in the usual manner. Also, the rod 35 may then be drawn rearwardly for swinging the arm 16 and rocking the arms 39 laterally inward out of engagement with the plates 38 so that the hood of the vehicle may be elevated or removed. I accordingly provide an arrangement whereby the ignition circuit locking means as well as the hood locking means employed will be both controlled by the setting of the contact arms 27. In order that the ignition circuit may be broken independently of the circuit closing arm 15, the switch 46 is provided. The present invention, therefore, provides means whereby closing of the ignition circuit of the vehicle engine by an unauthorized person will be rendered practically impossible while also, tampering with the ignition circuit wires will be prevented. I accordingly provide a locking mechanism of highly effective design and while I have illustrated the preferred embodiment of my invention still various minor changes or variations may be made without departing from the spirit thereof. I accordingly reserve the right to all such variations as may fall within the purview of the appended claims. For instance, it is contemplated that should it be necessary or advisable the hood locking means employed may be electrically operated by properly placing electro magnets to pull or otherwise operate the locking arms 39 and the arm 16 employed as a switch arm for closing a circuit through the magnets.

Formed in the control rods 34 and 35 at their lower sides are notches 47 arranged near the upper ends of said rods and secured to the dial plate 31 to bear against the upper sides of the rods are springs 48. Thus, when the rods are retracted, the notches will coact with the plate for holding the rods retracted, the springs 48 serving to yieldably lock the rods engaged with the plate. Thus, when desired, the hood locking arms 39 may be locked in inactive position while the ignition switch remains closed or vice versa.

Having thus described the invention, what is claimed as new is:

1. Means for locking a motor vehicle including a controlling arm, an armature arranged in the path of movement of said arm, an electromagnet arranged to withdraw the armature from the path of the controlling arm, and manually operable selective means for closing the circuit through the magnet to energize the same.

2. Means for locking a motor vehicle including a controlling arm, means for manually setting said arm, an armature adapted to project into the path of said arm, an electromagnet adapted when energized to withdraw the armature from the path of the controlling arm, and manually operable selective means for closing the circuit through the electromagnet to energize the same.

3. Means for locking a motor vehicle including a controlling arm, means for manually setting said arm, an armature adapted to project into the path of movement of said arm, an electromagnet arranged to withdraw the armature from the path of the controlling arm, a plurality of circuit closers in series with the electromagnet, and manually operable selective means for closing said circuit closers to effect energization of the electromagnet.

4. Means for locking a motor vehicle including a controlling arm, means for manually setting said arm, an armature adapted to prevent movement of said arm, an electromagnet co-operating with the armature, a plurality of circuit closers in series with the electromagnet and each comprising a stationary conductor arm, a movable conductor arm and a variable series of contacts, and means for passing the movable conductor arm over the series of contacts.

5. Means for locking a motor vehicle including a controlling arm, means for manually setting said arm, an armature adapted to prevent movement of said arm, an electromagnet co-operating with the armature, a plurality of circuit closers in series with the electromagnet and each comprising a set of contacts arranged in circular relation, a stationary conductor arm having one end disposed concentric to the set of contacts and its opposite end connected to a contact of another set of contacts, a rotatable conductor arm having one end journaled concentric with the set of contacts and electrically connected with the adjacent end of a stationary conductor arm and its opposite end arranged to ride upon the contacts, and manually operable means for rotating said conductor arms.

In testimony whereof I affix my signature.

OLIVA A. LUCIER.